US010694486B2

(12) United States Patent
Wei et al.

(10) Patent No.: US 10,694,486 B2
(45) Date of Patent: Jun. 23, 2020

(54) USER EQUIPMENT, RADIO ACCESS NETWORK NODE, COMMUNICATION SYSTEM, AND METHOD OF DETERMINING A RELATIVE POSITION OF USER EQUIPMENTS

(71) Applicant: Sony Corporation, Tokyo (JP)

(72) Inventors: Na Wei, Beijing (CN); Anders Berggren, Lund (SE)

(73) Assignee: SONY CORPORATION, Tokyo (JP)

( * ) Notice: Subject to any disclaimer, the term of this patent is extended or adjusted under 35 U.S.C. 154(b) by 55 days.

(21) Appl. No.: 14/664,501

(22) Filed: Mar. 20, 2015

(65) Prior Publication Data

US 2016/0183044 A1    Jun. 23, 2016

Related U.S. Application Data

(63) Continuation of application No. PCT/CN2014/094387, filed on Dec. 21, 2014.

(51) Int. Cl.
*H04W 4/00* (2018.01)
*H04W 64/00* (2009.01)
(Continued)

(52) U.S. Cl.
CPC ......... *H04W 64/003* (2013.01); *H04W 4/023* (2013.01); *H04W 8/005* (2013.01);
(Continued)

(58) Field of Classification Search
CPC ... H04W 64/00; H04W 84/12; H04W 84/045; H04W 36/0022; H04M 2250/10;
(Continued)

(56) References Cited

U.S. PATENT DOCUMENTS 8,013,734 B2 * 9/2011 Saigh ................ H04M 1/72541
340/539.1
9,930,559 B2 * 3/2018 Kusashima ........... H04W 24/10
(Continued)

FOREIGN PATENT DOCUMENTS

CN       102647246 A    8/2012
CN       102939788 A    2/2013
(Continued)

OTHER PUBLICATIONS

Asadi et al., A survey on device-to-device communication in cellular networks. IEEE Communications Surveys & Tutorials. Apr. 24, 2014;16(4):1801-19. DOI: 10.1109/COMST.2014.2319555. 18 pages.
(Continued)

*Primary Examiner* — Joseph Arevalo
(74) *Attorney, Agent, or Firm* — Tucker Ellis LLP

(57) ABSTRACT

A user equipment (2) comprises a wireless interface (20) for communication with a cellular communication network. The wireless interface (20) is operative for a device-to-device transmission and/or a device-to-device reception in a position determining procedure in which a relative position of the user equipment (2) and at least one further user equipment (3, 4) is determined. The user equipment (2) is operative to communicate with a radio access network node (11) of the cellular communication network for network assistance in the position determining procedure.

15 Claims, 10 Drawing Sheets

(51) Int. Cl.
*H04W 8/00* (2009.01)
*H04W 76/14* (2018.01)
*H04W 4/02* (2018.01)
*H04W 92/10* (2009.01)
*H04W 88/02* (2009.01)

(52) U.S. Cl.
CPC ........... *H04W 64/00* (2013.01); *H04W 76/14* (2018.02); *H04W 88/02* (2013.01); *H04W 92/10* (2013.01)

(58) Field of Classification Search
CPC ............... H04M 1/575; H04M 1/6016; H04N 1/00127; H04N 1/00244
USPC ..... 455/436, 456.3, 456.1, 90.2, 450, 426.1, 455/509, 411, 418, 574, 456.6, 456.2, 455/550.1, 552.1, 404.1, 454, 66.1, 412.2, 455/410; 370/330
See application file for complete search history.

(56) References Cited

U.S. PATENT DOCUMENTS

| | | | | | |
|---|---|---|---|---|---|
| 2004/0088348 | A1* | 5/2004 | Yeager | ................. | H04L 67/104 709/202 |
| 2004/0088646 | A1* | 5/2004 | Yeager | ................... | H04L 29/06 715/229 |
| 2004/0133640 | A1* | 7/2004 | Yeager | ................. | G06F 9/4862 709/204 |
| 2008/0108374 | A1* | 5/2008 | Xiong | .................... | G01S 19/41 455/456.6 |
| 2008/0220728 | A1* | 9/2008 | Seo | ........................ | H04W 4/10 455/90.2 |
| 2009/0310561 | A1* | 12/2009 | Grob | ..................... | H04W 36/04 370/331 |
| 2011/0306349 | A1 | 12/2011 | Hakola et al. | | |
| 2012/0244880 | A1* | 9/2012 | Lee | ....................... | G01S 5/0081 455/456.1 |
| 2013/0084859 | A1* | 4/2013 | Azar | ..................... | H04W 48/08 455/435.1 |
| 2014/0066018 | A1* | 3/2014 | Zhu | ....................... | H04W 4/008 455/411 |
| 2014/0162714 | A1* | 6/2014 | Kim | .................... | H04W 76/023 455/509 |
| 2014/0229959 | A1* | 8/2014 | Beckhardt | .............. | H04N 21/65 725/5 |
| 2015/0072713 | A1* | 3/2015 | Zhu | ....................... | H04W 8/005 455/456.3 |
| 2015/0208262 | A1* | 7/2015 | Siomina | ................ | H04W 64/00 370/252 |
| 2015/0230057 | A1* | 8/2015 | Jiang | ..................... | G01S 5/0263 455/456.2 |
| 2015/0327311 | A1* | 11/2015 | Wei et al. | ........... | H04L 12/6418 370/329 |
| 2015/0358907 | A1* | 12/2015 | Berggren | .......... | H04W 52/0229 455/574 |
| 2016/0037569 | A1* | 2/2016 | Kim | ....................... | H04W 4/008 455/450 |
| 2016/0044525 | A1* | 2/2016 | Alnashi | .................. | H04W 4/70 455/418 |
| 2016/0100285 | A1* | 4/2016 | Zhu | ....................... | H04W 4/023 455/426.1 |
| 2016/0205714 | A1* | 7/2016 | Morita | .............. | H04W 74/0833 455/450 |
| 2017/0230919 | A1* | 8/2017 | Siomina | ................ | H04W 52/383 |
| 2017/0238352 | A1* | 8/2017 | Palat | ..................... | H04W 76/14 370/329 |
| 2018/0042002 | A1* | 2/2018 | Yang | .................... | H04W 48/02 |

FOREIGN PATENT DOCUMENTS

| | | | | |
|---|---|---|---|---|
| CN | 103327568 A | | 9/2013 | |
| CN | 103702346 | | 4/2014 | |
| CN | 103841636 A | | 6/2014 | |
| CN | 104144501 A | | 11/2014 | |
| WO | WO 2016/019979 A1 * | 11/2016 | ........... | H04W 28/04 |

OTHER PUBLICATIONS

International Search Report and Written Opinion dated Sep. 22, 2015 in connection with Application No. PCT/CN2014/094387.

* cited by examiner

USER EQUIPMENT, RADIO ACCESS NETWORK NODE, COMMUNICATION SYSTEM, AND METHOD OF DETERMINING A RELATIVE POSITION OF USER EQUIPMENTS

CROSS-REFERENCE TO RELATED APPLICATION

This application is a continuation application claiming the benefit of International Application No. PCT/CN 2014/094387, filed Dec. 21, 2014, the entire contents of which is incorporated herein by reference.

FIELD OF THE INVENTION

Embodiments of the invention relate to mobile communication systems. Embodiments of the invention relate in particular to techniques for determining a relative position of a user equipment and at least one further user equipment using device-to-device signaling messages or device-to-device communication messages.

BACKGROUND OF THE INVENTION

The demand for mobile data and voice communication continues to evidence significant growth. Examples for mobile communication systems include cellular-based wireless communication networks. Such networks include various network nodes. The network nodes may include base stations which respectively provide coverage for a radio cell.

A user equipment of a mobile communication network may be a Proximity Service (ProSe) enabled device. Several ProSe enabled user equipments which are located in proximity to each other are operative to perform device-to-device (D2D) communication. D2D communication allows user equipments of a mobile communication network to directly communicate with each other when the user equipments are located in proximity to each other. D2D communication has a wide variety of applications, including public safety and other use cases. Emergency calls are one example for public safety use cases of D2D communication. Direct data or voice communication between user equipments is another example for use cases of D2D communication. For illustration, ProSe enabled user equipments located in proximity to each other may engage in data or voice communication.

Determining a relative position of a user equipment and at least one further user equipment may be required or beneficial in a wide range of application scenarios. For illustration, relative position information may be required for network control purposes, for estimating data rates or power consumption in D2D communication, for identifying suitable candidate user equipments which can engage in D2D communication, or other purposes.

Various techniques are available for establishing a position of a user equipment relative to a base station, e.g. relative to an evolved NodeB (eNB). Examples for such techniques include multilateration-based techniques such as OTDOA ("Observed Time Difference Of Arrival").

Such techniques may not always be appropriate for determining relative positions of a user equipment and at least one further user equipment. For illustration, signaling overhead or power consumption may become large.

SUMMARY OF THE INVENTION

There is a need in the art for techniques which allow a relative position between user equipments to be established.

There is a need in the art for techniques which allow the relative position of a user equipment and at least one further user equipment to be determined reliably and in an efficient way.

According to exemplary embodiments of the invention, the relative position determination takes advantages of both device-to-device communication over a wireless interface of the user equipment, in combination with network assistance provided by a radio access network node such as an eNodeB (eNB).

By using device-to-device communication messages or device-to-device signaling messages, the relative position may be determined with high accuracy.

The network assistance provided in the position determining procedure improves the efficiency of the position determining procedure.

Network assistance may be provided in various ways. For illustration, the cellular radio access network node may provide information relating to resources and/or transmit powers of signals transmitted by at least one further user equipment in the position determining procedure. The user equipment may use this information to monitor and/or process signals such as a device-to-device synchronization signal (D2DSS), a device-to-device data packet, or positioning reference signals (PRS) transmitted by the at least one further user equipment.

For further illustration, the cellular radio access network node may alternatively or additionally compute the relative position based on a report message received from the user equipment.

A user equipment according to an embodiment comprises a wireless interface for communication with a cellular communication network. The wireless interface is operative for a device-to-device transmission and/or a device-to-device reception in a position determining procedure in which a relative position of the user equipment and at least one further user equipment is determined. The user equipment is operative to communicate with a radio access network node of the cellular communication network for network assistance in the position determining procedure.

The device-to-device transmission may be a device-to-device signaling messages, such as a device-to-device positioning reference signal, or a device-to-device communication message transmitted by the user equipment to the at least one further user equipment.

The device-to-device reception may be a device-to-device signaling message, such as a device-to-device positioning reference signal, or a device-to-device communication message received by the user equipment from the at least one further user equipment.

The user equipment may be operative to receive a message associated with the position determining procedure from the radio access network node.

The message may be a broadcast message from the radio access network node.

The message may comprise information on resources to be used in the position determining procedure.

The message may comprise information on resources for the device-to-device transmission and/or the device-to-device reception in the position determining procedure.

The message may alternatively or additionally comprise information on a transmit power in the position determining procedure.

The user equipment may be operative to perform the device-to-device transmission and/or the device-to-device reception in accordance with the message received from the from the radio access network node. The user equipment may comprise a processing device operative to perform the device-to-device reception in resources specified by the message.

The wireless interface may be operative to receive device-to-device signaling messages or device-to-device communication messages from the at least one further user equipment in the position determining procedure. Resources in which the device-to-device signaling messages or device-to-device communication messages are received may be defined by the message broadcast by the radio access network node.

The user equipment may comprise a processing device operative to process the received device-to-device signaling messages or device-to-device communication messages based on the message received from the radio access network node.

The processing device may be operative to determine the relative position by processing the received device-to-device signaling messages or device-to-device communication messages based on the message received from the radio access network node. The processing device may be operative to compute the relative position, using information included in the message broadcast by the radio access network node.

The message received from the radio access network node may comprise information on a device-to-device positioning reference signal. The message may define resources used by the at least one further user equipment in a time-frequency resource grid for transmitting the device-to-device signaling messages or device-to-device communication messages in the position determining procedure.

The user equipment may be operative to request the radio access network node to broadcast the message.

The user equipment may be operative to determine, in dependence on a target precision of the position determining procedure, whether the radio access network node is to provide assistance in the position determining procedure.

The wireless interface may be operative to receive device-to-device signaling messages or device-to-device communication messages from the at least one further user equipment in the position determining procedure. The user equipment may be operative to transmit a report message to the radio access network node, the report message being indicative of a measurement result obtained for the received device-to-device signaling messages or device-to-device communication messages. Thereby, the radio access network node can perform the computation of the relative position.

The user equipment may be operative to receive information on the relative position from the radio access network node in response to transmitting the report message. Thereby, the relative position can be provided to the user equipment if it is needed by the user equipment.

The user equipment may be operative to determine, based on applications executed by the user equipment, whether network assistance is required for the position determining procedure.

The radio access network node may be an eNodeB.

A radio access network node according to an embodiment comprises a wireless interface for communication with a user equipment. The radio access network node may comprise a control device coupled to the wireless interface. The control device may be operative to assist the user equipment in a position determining procedure for determining a relative position of the user equipment and at least one further user equipment.

The radio access network node may be operative to transmit a message associated with the position determining procedure. The radio access network node may be operative to broadcast the message associated with the position determining procedure.

The message may comprise information on resources to be used in the position determining procedure.

The message may comprise information on resources for the device-to-device transmission and/or the device-to-device reception in the position determining procedure.

The message may alternatively or additionally comprise information on a transmit power in the position determining procedure.

The radio access network node may be operative to selectively boost a transmit power or to selectively mute subframes, in dependence on whether the user equipment is located close to an edge of a cell.

The message may comprise information on a device-to-device positioning reference signal.

The radio access network node may be operative to generate the message in dependence on a target precision of the position determining procedure.

The radio access network node may be operative to receive a report message from the user equipment.

The control device may be operative to determine a relative position of the user equipment and at least one further user equipment in response to receiving the report message.

The radio access network node may be operative to transmit information on the relative position to the user equipment in response to the report message.

The radio access network node may be an eNodeB.

A communication system according to an embodiment comprises the user equipment according to an embodiment and the radio access network node according to an embodiment.

The radio access network node provides assistance to the user equipment in the position determining procedure.

A method of determining a relative position of a user equipment and at least one further user equipment according to an embodiment is provided. The method comprises performing, via a wireless interface of the user equipment, a device-to-device transmission and/or a device-to-device reception in a position determining procedure for determining the relative position of the user equipment and the at least one further user equipment. The method comprises communicating, via the wireless interface of the user equipment, with a radio access network node of a cellular communication network for obtaining network assistance in the position determining procedure.

The method may be performed by a user equipment or a communication system according to an embodiment.

In the method, the device-to-device transmission may be a device-to-device signaling messages, such as a device-to-device PRS, or a device-to-device communication message transmitted by the user equipment to the at least one further user equipment.

In the method, the device-to-device reception may be a device-to-device signaling messages, such as a device-to-device PRS, or a device-to-device communication message received by the user equipment from the at least one further user equipment.

In the method, the user equipment may receive a message associated with the position determining procedure from the radio access network node.

In the method, the message may be a broadcast message from the radio access network node.

In the method, the message may comprise information on resources to be used in the position determining procedure.

In the method, the message may comprise information on resources for the device-to-device transmission and/or the device-to-device reception in the position determining procedure.

In the method, the message may alternatively or additionally comprise information on a transmit power in the position determining procedure.

In the method, the user equipment may perform the device-to-device transmission and/or the device-to-device reception in accordance with the message received from the from the radio access network node. The user equipment may comprise a processing device which performs the device-to-device reception in resources specified by the message.

In the method, the user equipment may receive device-to-device signaling messages or device-to-device communication messages from the at least one further user equipment in the position determining procedure. Resources in which the device-to-device signaling messages or device-to-device communication messages are received may be defined by the message broadcast by the radio access network node.

In the method, the user equipment may process the received device-to-device signaling messages or device-to-device communication messages based on the message received from the radio access network node.

In the method, the user equipment may determine the relative position by processing the received device-to-device signaling messages or device-to-device communication messages based on the message received from the radio access network node. The user equipment may compute the relative position, using information included in the message broadcast by the radio access network node.

The message received from the radio access network node may comprise information on a device-to-device positioning reference signal. The message may define resources used by the at least one further user equipment in a time-frequency resource grid for transmitting the device-to-device signaling messages or device-to-device communication messages in the position determining procedure.

In the method, the user equipment may request the radio access network node to broadcast the message.

In the method, the user equipment may determine, in dependence on a target precision of the position determining procedure, whether the radio access network node is to provide assistance in the position determining procedure.

In the method, the user equipment may receive device-to-device signaling messages or device-to-device communication messages from the at least one further user equipment in the position determining procedure. The user equipment may transmit a report message to the radio access network node, the report message being indicative of a measurement result obtained for the received device-to-device signaling messages or device-to-device communication messages. Thereby, the radio access network node can perform the computation of the relative position.

In the method, the radio access network node may compute the relative position based on the report message received from the user equipment.

In the method, the user equipment may receive information on the relative position from the radio access network node in response to transmitting the report message. Thereby, the relative position can be provided to the user equipment if it is needed by the user equipment.

In the method, the user equipment may determine, based on applications executed by the user equipment, whether network assistance is required for the position determining procedure.

In the method, the radio access network node may be an eNodeB.

In the devices, systems and methods according to embodiments, different levels of network assistance may be provided in a relative position determination which employs direct device-to-device signaling or device-to-device communication. The different levels of network assistance may attain various effects. For illustration, the user equipment can compute the relative position very efficiently and accurately by using information on resources and transmit powers provided by the eNodeB. Alternatively or additionally, by feeding measurement results back to the eNodeB, the eNodeB can compute the relative position and can provide this information back to the user equipment if required. Operation of the user equipment may thereby be kept simple.

Although specific features described in the above summary and the following detailed description are described in the context of specific embodiments and aspects of the invention, the features of the embodiments and aspects may be combined with each other unless specifically noted otherwise.

BRIEF DESCRIPTION OF THE DRAWINGS

Embodiments of invention will now be described in more detail with reference to the accompanying drawings in which like or identical reference numerals designate like or identical elements.

DETAILED DESCRIPTION OF PREFERRED EMBODIMENTS

Figure 1:
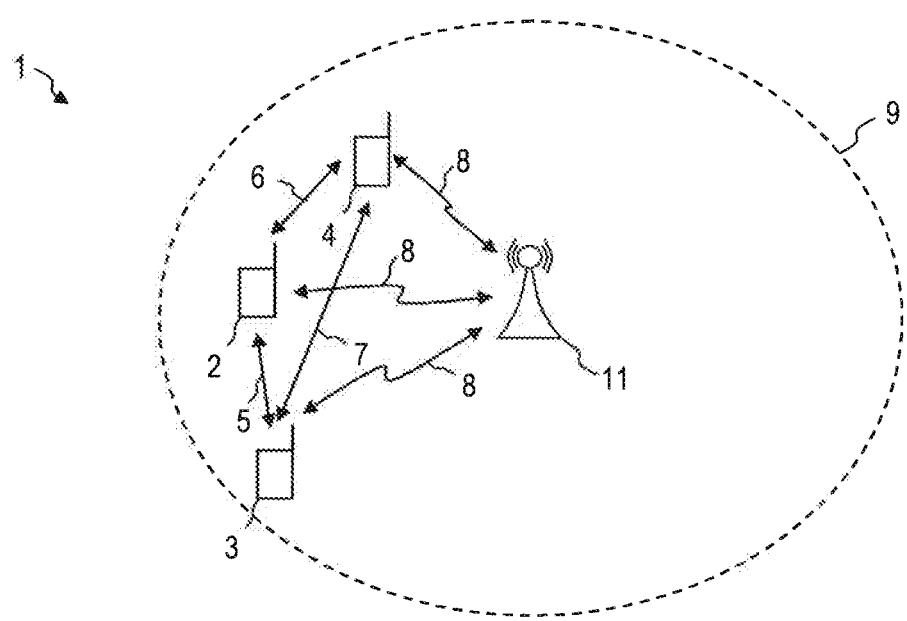
FIG. 1 shows a communication system according to an embodiment.

In the following, exemplary embodiments of the invention will be described in more detail. It has to be understood that the features of the various exemplary embodiments described herein may be combined with each other unless specifically noted otherwise. Identical or similar reference numerals refer to identical or similar components.

While exemplary embodiments will be described with reference to certain use cases for a network-assisted position determination using device-to-device (D2D) communication or D2D signaling, it is to be understood that the techniques may be used for a wide variety of use cases, including public safety use cases and other commercial use cases. While exemplary embodiments will be described in the context of certain cellular mobile communication networks, e.g. Long Term Evolution (LIE) networks, the embodiments are not described to such mobile communication techniques.

FIG. 1 shows a communication system 1 according to an embodiment. The communication system 1 includes a mobile communication system which is configured as a cellular communication network. The cellular communication network may comprise a plurality of base stations, each serving a cell. A base station 11 and an associated cell 9 are schematically shown in FIG. 1. The base stations may communicate with each other via wireless radio communications or via an operator core network. The cellular communication network may be a Long Term Evolution (LTE) network. A radio access network (RAN) of the cellular communication network may be an evolved UTRAN (E-UTRAN), with the base station 11 being an evolved Node B (eNodeB). The base stations may be connected to a Mobility Management Entity (MME) and/or Serving Gateway (S-GW) in the operator core network.

The base station 11 provides a radio cell 9 in which user equipments (UEs) 2, 3, 4 may communicate directly with the base station 11 via radio communication 8. The UEs 2, 3, 4 may respectively have a wireless interface for communication with the RAN of the cellular communication network.

Several UEs 2, 3, 4 are capable of performing a D2D discovery and D2D communication. According to the terminology in the pertinent field of the art, the term D2D communication refers to a radio communication between UEs which is performed directly between the UEs. The radio signals 5, 6, 7 transmitted in the D2D discovery and/or D2D communication may not be processed by the base station of the cellular communication network. The radio signals 5, 6, 7 transmitted in the D2D discovery and/or D2D communication may not pass the RAN of the cellular communication network. The radio signals 5, 6, 7 transmitted in the D2D discovery and/or D2D communication may not be processed by a core network of the wireless cellular communication network. The UEs which are configured for D2D discovery and D2D communication may use the same wireless interface for communicating with the RAN and for D2D purposes. A UE configured for D2D discovery and D2D communication may also be referred to as Proximity Service (ProSe)-enabled UE in the art.

The UEs 2, 3, 4 which are configured for D2D discovery and/or D2D communication may be operative to transmit D2D communication and/or D2D signaling 5, 6, 7 in a position determining procedure in which the position of a UE 2 is determined relative to at least one further UE.

The position determining procedure may determine a distance between the UE 2 and one or several further UEs 3, 4.

The base station 11, which may be an eNodeB, may provide assistance in the position determining procedure. For illustration, the base station 11 may broadcast information on resources, transmit powers, and identifiers of the one or several further UEs 3, 4 which transmit D2D communication and/or D2D signaling in the position determining procedure. The UE 2 may utilize this information broadcast by the base station 11 such that the receiver of the UE 2 monitors specific resources defined by the base station 11 for the signals required for determining the relative position. The UE 2 may alternatively or additionally provide measurement results to the base station 11 for further evaluation.

Figure 2:
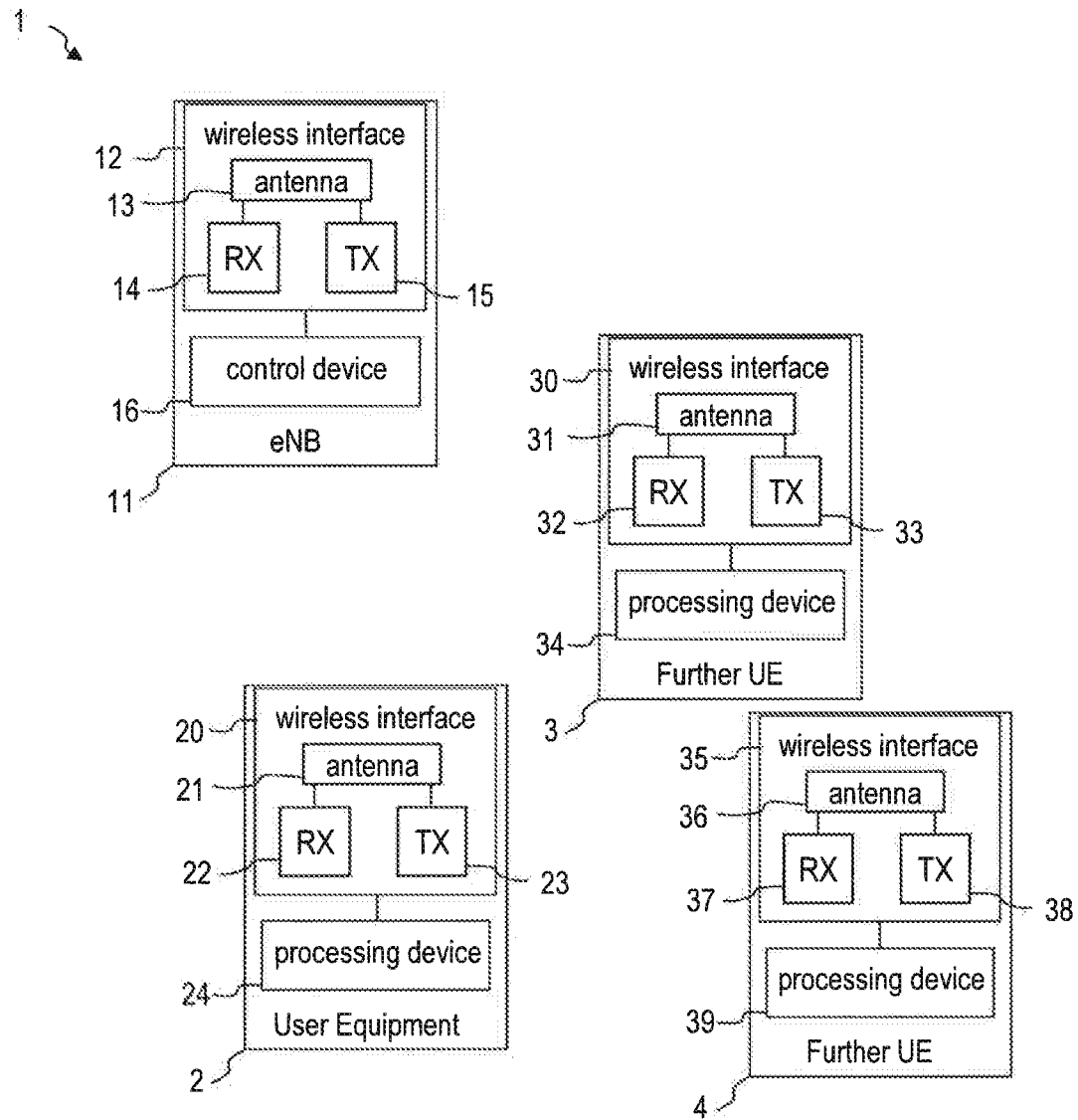
FIG. 2 is a block diagram representation of a communication system according to an embodiment.

FIG. 2 is a schematic block diagram of a communication system 1 according to an embodiment.

The UE 2 has a wireless interface 20. The wireless interface 20 may be operative to communicate with the RAN 10. The wireless interface 20 may be for communication over the E-UTRA air interface. The wireless interface 20 may have an antenna 21, a receiver path 22 and a transmitter path 23 for communication over the E-UTRA air interface. The wireless interface 20 may be operative to transmit radio signals or to receive radio signals as direct D2D communication or D2D signaling in a position determining procedure, as will be explained in more detail below.

The UE 2 has a processing device 24 connected to the wireless interface 20. The processing device 24 may comprise one or several microprocessors, one or several microcontrollers, one or several processors, one or several controllers, one or several application specific integrated circuits (ASICs) and/or a combination of such devices.

The processing device 24 may be operative to retrieve information on resources and/or transmit powers and/or identifiers of the further UEs 3, 4 which transmit D2D signaling or D2D communication in the position determining procedure. The processing device 24 may be operative to process a message broadcast by the base station 11 to determine in which resources and/or with which transmit powers one or several further UEs 3, 4 transmit D2D signaling or D2D communication in the position determining procedure.

The processing device 24 may be operative to evaluate a received power of D2D signaling or D2D communication received from the one or several further UEs 3, 4. Thereby, the processing device 24 may establish a distance from signal attenuation, for example. The processing device 24 may establish distances of the UE 2 and several further UEs 3, 4 from signal attenuation determined by the processing device 24 by comparing the measured received power with the transmit power(s) indicated by a broadcast message of the base station 11.

The processing device 24 may be operative to determine the relative position of the UE 2 and several further UEs 3, 4 based on OTDOA, for example. Thereby, an a greater accuracy may be attainable than by relying exclusively on attenuation measurements.

The processing device 24 may be operative to cause transmission of a report message to the base station 11. The report message may include measurement results for further evaluation by the base station 11. For illustration, the computation of the relative position may be performed in the base station 11 rather than locally in the UE 2.

The processing device 24 may be operative to process a message received at the receiver path 22 of the wireless interface 20 from the base station 11. The message may include information on resources which are used by the further UEs 3, 4 in the position determining procedure.

The processing device 24 may be operative to control the receiver path 22 in the position determining procedure in dependence on the message received from the base station 11. For illustration, the receiver path 22 may specifically monitor frequencies and/or symbols in which one or several further UEs 3, 4 may transmit positioning reference signals or other signals to be used in the position determination.

The processing device 24 may be operative to control the transmitter path 23 to transmit D2D communication and/or D2D signaling to one or several further UEs 3, 4 in the position determining procedure. Alternatively or additionally, the processing device 24 may be operative to control the transmitter path 23 to transmit a report message to the base station 11 to thereby report measurement results obtained in the position determining procedure.

One or several further UEs 3, 4 may be provided. The further UEs 3, 4 may be configured to transmit D2D signaling, e.g. dedicated D2D-PRS, to the UE 2 to allow the relative position to be determined. Differences in arrival time and/or attenuation of signal power may be evaluated by the UE 2 to determine the relative position.

The further UE 3 has a wireless interface 30 comprising an antenna 31, a receiver path 32, and a transmitter path 33. The wireless interface 30 may be operative to communicate with the RAN 10. The wireless interface 30 may be for communication over the E-UTRA air interface. The wireless interface 30 may have an antenna 31, a receiver path 32 and a transmitter path 33 for communication over the E-UTRA air interface. The wireless interface 30 may be operative to transmit D2D signaling or D2D communication to the UE 2 in a position determination procedure.

The further UE 3 has a processing device 34 connected to the wireless interface 30. The processing device 34 may comprise one or several microprocessors, one or several microcontrollers, one or several processors, one or several controllers, one or several application specific integrated circuits (ASICs) and/or a combination of such devices.

The processing device 34 of the further UE 3 may be configured to control the wireless interface 30 to transmit D2D signaling or D2D communication to the UE 2. The processing device 34 may be configured to retrieve information on resources which are to be used for transmitting D2D-PRS or other signals for the position determination procedure from a message broadcast or otherwise transmitted by the base station 11. The further UE 3 may be configured to transmit radio signals for direct reception by the UE 2 in the position determination procedure, with the radio signals being transmitted with a timing, transmit power and/or frequency which may be configured by the base station 11. The processing device 34 of the further UE 3 may be configured to control the wireless interface 30 in accordance with resources, transmit power, and/or other parameters broadcast by the base station 11.

The further UE 4 may comprise a processing device 39 coupled to a wireless interface 35. The wireless interface 35 may comprise an antenna 36, a receive path 37, and a transmit path 38. The wireless interface 35 and the processing device 39 of the further UE 4 may be configured as explained in the context of the further UE 3.

The base station 11 may comprise a wireless interface 12 for communication with the UE 2 and the further UEs 3, 4. The wireless interface 12 may comprise at least one antenna 13, a receive circuit 14, and a transmit circuit 14.

A control device 16 is configured to control operation of the base station 11. The control device 16 may be configured to control the wireless interface 12 to transmit information on resources to be used in the position determining procedure and/or on transit powers in the position determining procedure and/or on the further UEs which are to participate in the position determining procedure. The information may be transmitted by the base station in a broadcast message. The information may alternatively be transmitted in dedicated signaling, e.g. in RRC signaling.

The control device 16 may be configured to transmit information on resources to be used in the position determining procedure and/or on transit powers in the position determining procedure and/or on the further UEs which are to participate in the position determining procedure in response to a request from the UE 2. The UE 2 may thus trigger the base station 11 to assist in the position determining procedure.

The control device 16 may be configured to compute a relative position of the UE 2 and at least one further UE 3, 4. The control device may evaluate measurement results reported from the UE 2 and, optionally, from at least one further UE 3, 4. The control device may determine the relative position based on attenuation and/or time difference of arrival times reported by the UE 2. When the control device 16 computes the relative position, the base station 11 may optionally provide information on the computed relative position to the UE 2 and/or the at least one further UE 3, 4.

As will be described in more detail with reference to FIG. 3 to FIG. 12 below, relative distance may be determined using D2D communication or D2D signaling, with the base station 12 supporting this by providing relevant information on the transmitting further UE 3, 4 and/or by evaluating measurement results reported by the UE 2 and, optionally, the at least one further UE.

The techniques of implementing an eNodeB-assisted distance determining procedure which includes D2D communication or D2D signaling can support more accurate distance measurements even on a larger scale. Battery lifetime of the UE 2 may also be improved by the assistance offered by the eNodeB, because the processing and monitoring tasks that need to be performed by the UE 2 may be reduced compared to positioning techniques which are performed without network assistance by the UE 2.

In embodiments, the UE 2 may itself perform the computations required to determine the relative position, e.g. the distance and optionally also a direction angle, of the UE 2 relative to a further UE 3, 4. The UE 2 may use information on the D2D transmissions of the at least one further UE 3, 4 in this procedure, as will be explained in more detail with reference to FIG. 3 and FIG. 4.

Figure 3:
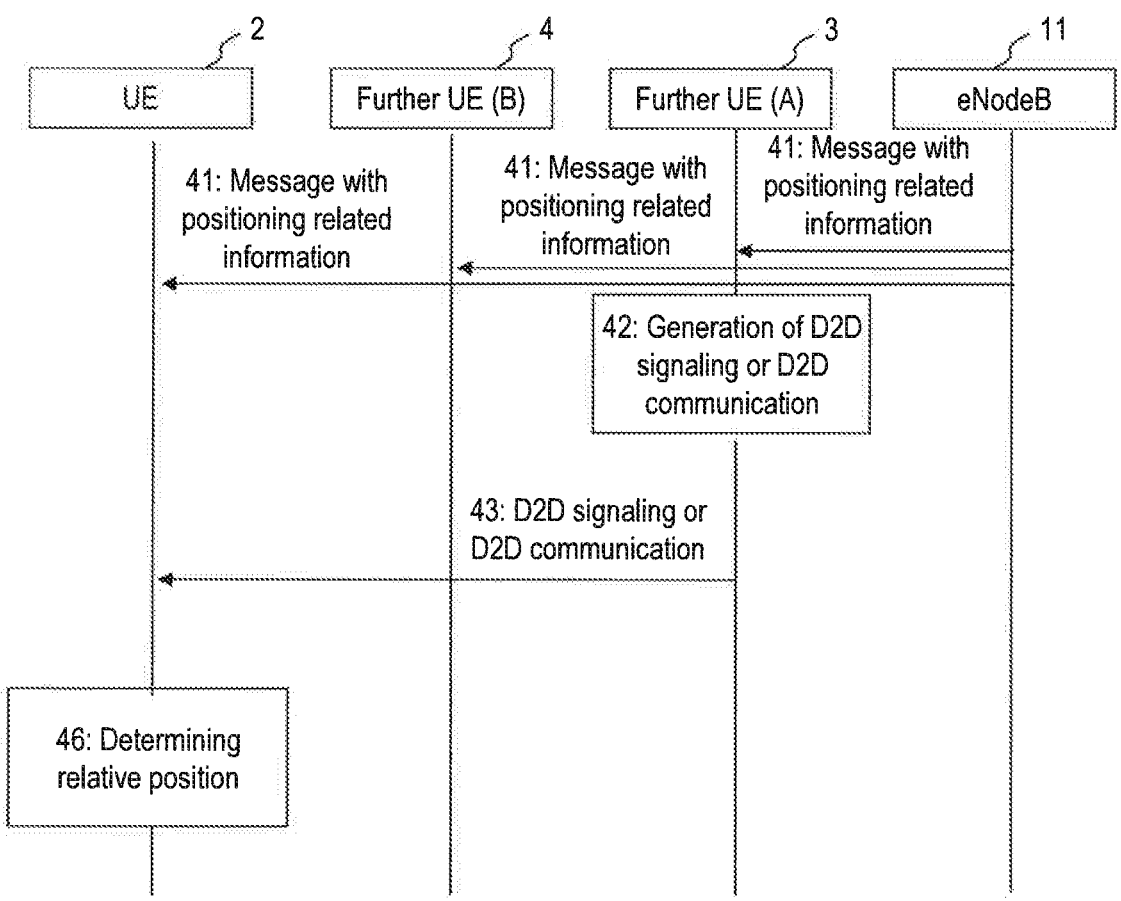
FIG. 3 is a signal flow diagram for a communication system which comprises a user equipment according to an embodiment.

FIG. 3 is a signaling diagram which may be implemented in a communication system according to an embodiment.

The eNodeB may broadcast a message 41 which includes positioning related information. The broadcast message 41 may be sent by the eNodeB and may be received by both the UE 2 and the at least one further UEs. The information in the message 41 may include information about the at least one further UE which transmits D2D communication or D2D signaling in the position determining procedure.

The information related to the transmitting at least one further UE can comprise any one or any combination of: information such as a power setting of a transmitter, resource allocation, identifier information, and/or optionally location information. The information included in the message 41 may optionally location information of the transmitting further UEs. The UE 2 which will subsequently receive the D2D signals or D2D communication is thereby informed where to detect and can use this information to calculate the relative position. The further UEs which transmit D2D signals or D2D communication messages to the UE 2 are also informed about the resources in which they are allowed to transmit in the position determining procedure and/or the transmit power which is to be used. The message 41 may include information on which further UEs are to transmit D2D signals or D2D communication for the positioning. For illustration, a further UE (A) may be requested to participate in the position determining procedure, while another further UE (B) may not be requested to participate in the position determining procedure. The message 41 may include identifiers of the participating further UE(s), for example.

At 42, a further UE generates a D2D signal or D2D communication message for position determination. The D2D signal or D2D communication message may be a D2D-PRS. The D2D-PRS may be a signal which is different from D2D discovery signals and D2D synchronization signals (D2DSS). The D2D signal or D2D communication message may be a D2DSS or a D2D discovery message, for example. By using such latter messages, it is not necessary to introduce new dedicated D2D-PRS for positioning purposes.

The D2D signal or D2D communication message 43 for position determination is transmitted as device-to-device radio transmission. The D2D signal or D2D communication message 43 may be transmitted in resources and/or with a transmit power defined by the message 41.

At 46, the UE may determine the relative position. The UE may perform measurements on the received D2D signal or D2D communication message 43. The UE may determine a received power and may compare the received power to a transmit power defined by the message 41 to estimate the distance based on attenuation. The UE may use other techniques, such as time based techniques, to determine the distance.

The receiver of the UE may be operated in dependence on the resources defined by the message 41. The UE may specifically monitor resources defined by the message 41 to detect the D2D signal or D2D communication message 43.

The UE may optionally report a result of the position determination to the eNodeB and/or the at least one further UE.

Figure 4:
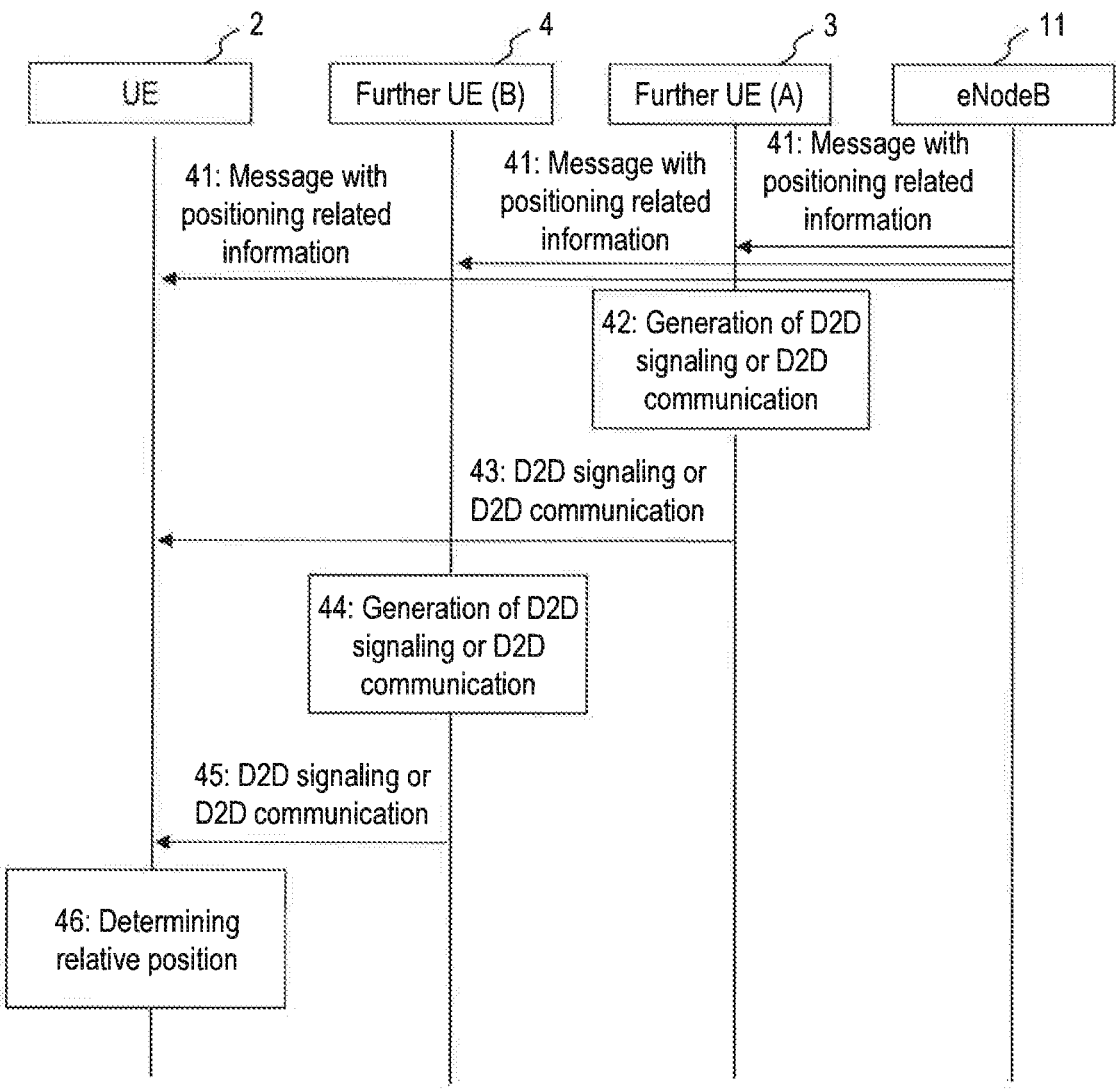
FIG. 4 is a signal flow diagram for a communication system which comprises a user equipment according to an embodiment.

FIG. 4 is a signaling diagram which may be implemented in a communication system according to an embodiment.

The UE may receive D2D signals or D2D communication messages from more than one further UE. Time of arrival based techniques may be used to compute the relative position, e.g. by multilateration.

The message 41 may include information which requests several further UEs to transmit D2D signals or D2D communication messages in the position determination procedure.

Accordingly, as described with reference to FIG. 3, a first further UE generates a D2D signal or D2D communication 43 which is received and processed by the UE.

A second further UE generates, at 44, a D2D signal or D2D communication 45 which is received and processed by the UE. The resources for the transmission of the D2D signal or D2D communication 45 may be different from the resources for the transmission of the D2D signal or D2D communication 43. For illustration, different resource blocks may be allocated for the transmission of the D2D signal or D2D communication 43 and the transmission of the D2D signal or D2D communication 45.

At 46, the UE may perform measurements on the received D2D signal or D2D communication message 43 and on the received D2D signal or D2D communication message 45. The UE may determine differences of arrival times to determine the distance from at least one or from several ones of the further UEs. Multilateration techniques may be used to establish the distance and, optionally, also a direction in which the UE is located relative to at least one further UE.

The receiver of the UE may be operated in dependence on the resources defined by the message 41. The UE may specifically monitor resources defined by the message 41 to detect the D2D signal or D2D communication message 43 and to detect the D2D signal or D2D communication message 45.

The UE may optionally report a result of the position determination to the eNodeB and/or the at least one further UE.

Figure 5:
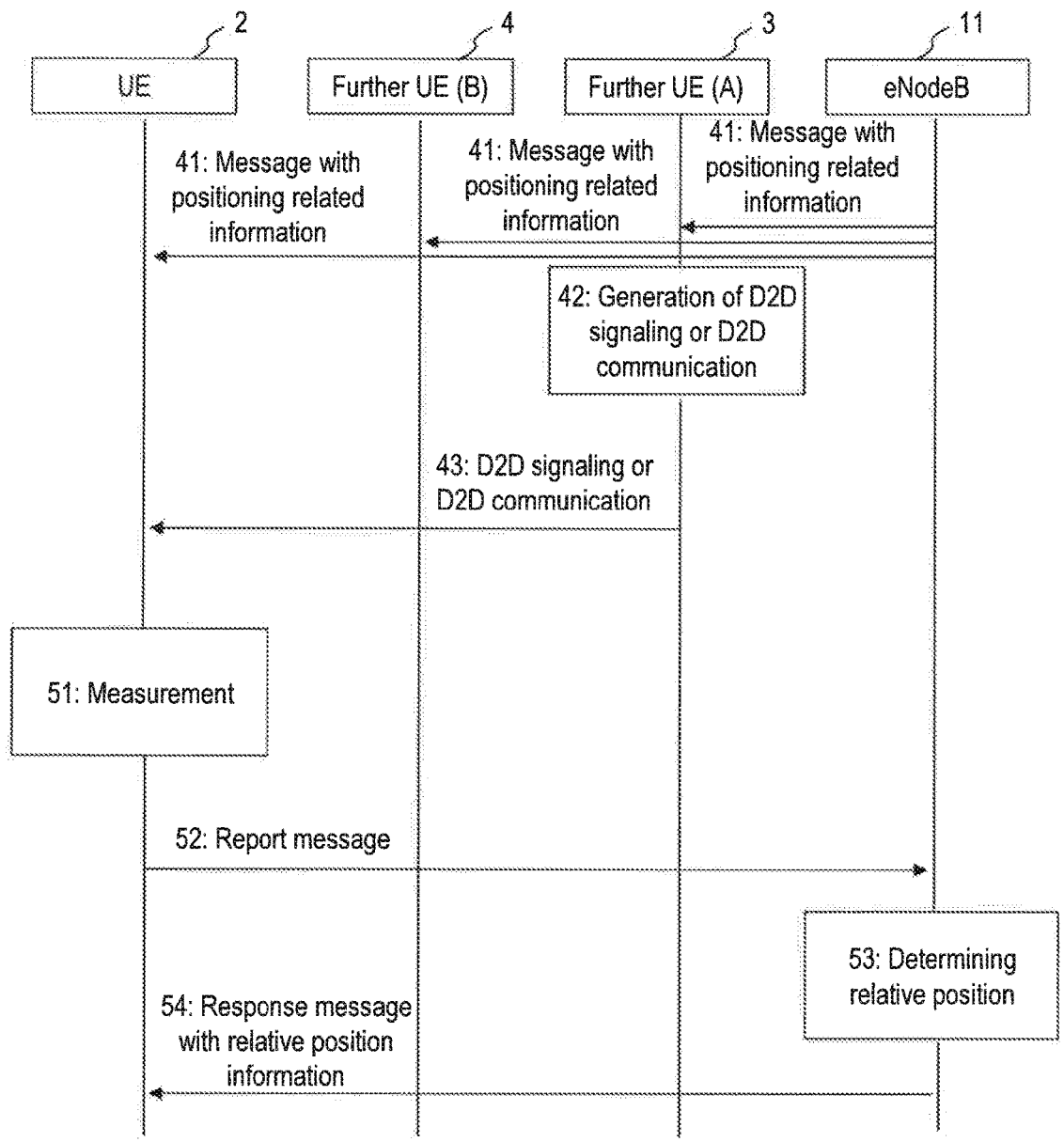
FIG. 5 is a signal flow diagram for a communication system which comprises a user equipment according to an embodiment.

FIG. 5 is a signaling diagram which may be implemented in a communication system according to an embodiment.

The UE does not need to make the calculations for determining the relative position itself, but the eNodeB may assist in this task by computing the relative position based on measurement results reported by the UE.

The eNodeB may broadcast or otherwise transmit a message 41 which includes information on the resources to be used for generation and transmission of the D2D signal or D2D communication message 43. The eNodeB does not need to include information on the transmit power in the message 41 when the computation of the relative position is performed in the eNodeB itself.

The UE receives the D2D signal or D2D communication message 43 and performs measurements 51 on the received D2D signal or D2D communication message 43. The UE may at least determine a received power and/or an arrival time. The UE may generate and transmit a report message 52. The report message 52 may be transmitted to the eNodeB. The report message 52 may be generated in dependence on the measurements 51. The report message 52 may include information on the received power and/or the arrival time.

The eNodeB may perform a position computation 53. The eNodeB may compute a distance between the further UE and the UE. The eNodeB may optionally compute a direction in which the UE and the further UE are spaced from each other, e.g. by evaluating the measurement results obtained for D2D signals from at least two different further UEs.

The eNodeB may optionally transmit the relative position information 54 to the UE. The eNodeB may transmit the relative position information 54 to the UE selectively only if the information is needed by the UE itself. If the relative position information is only required in the cellular communication network, the eNodeB does not need to transmit the relative position information 54.

In an implementation as described with reference to FIG. 4, the UE performs raw measurements such as RSRP (reference signal received power) or time difference measurements, but does not compute the relative position itself. The raw measurement results are provided to the eNodeB. The eNodeB performs the calculation to determine the relative position. The UE may get the distance or other position information from the eNodeB, depending on if it is the network or the UE that are interested in the positioning estimates.

Because the eNodeB has information on all power setting and on the allocation of all transmission, the eNodeB can perform the determination of the distance or other position information efficiently. The operation of the UE and the D2D signaling between the UE and the further UEs may be kept simple.

By implementing an eNodeB-assistance in the distance determining procedure, several UEs can be made to perform detections simultaneously. Power efficiency may be enhanced because the UEs need to only monitor certain resources in which the D2D signals are transmitted for the position determination.

In any one of the techniques described above, the eNodeB may reserve resources for the D2D signal or D2D communication which is evaluated by the UE in the position determining procedure in such a way that interference with adjacent cells may be reduced. Better signal quality may be attained thereby, improving the positioning accuracy.

For illustration, and as will be explained in more detail with reference to FIG. 6 and FIG. 7, a base station may allocate resources for the D2D signal or D2D communication message transmission in the position determining procedure which are aligned, in the time domain, with mute subframes in an adjacent cell.

Figure 6:
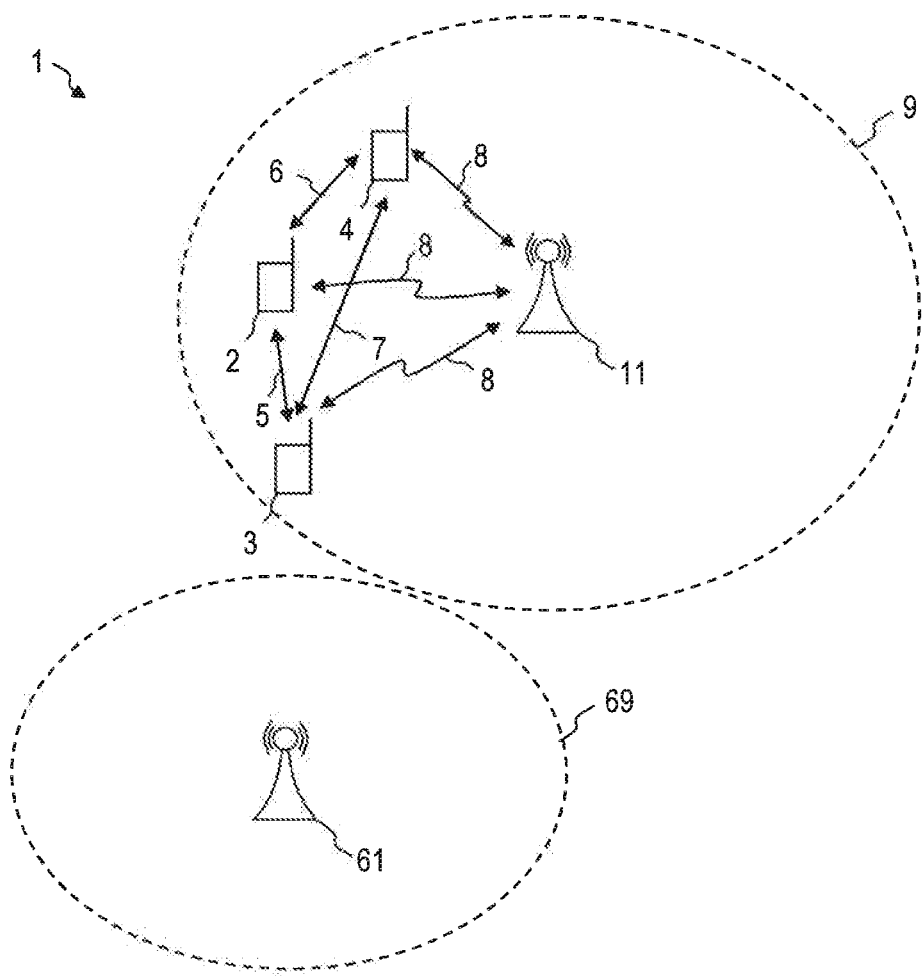
FIG. 6 shows a communication system according to an embodiment.

FIG. 6 shows a communication system according to an embodiment. A further UE 3 may be positioned in proximity to an edge of the cell 9. D2D signal transmissions by the further UE 3 may cause interference with radio signals of an adjacent cell 69 which is served by another base station 61.

The base station 11 may communication with the other base station(s) 61 over a core network, for example. The base station 11 may allocate D2D resources to the further UE 3 which overlap, in the time domain, with sub frames which are muted in the adjacent cell 69.

Figure 7:
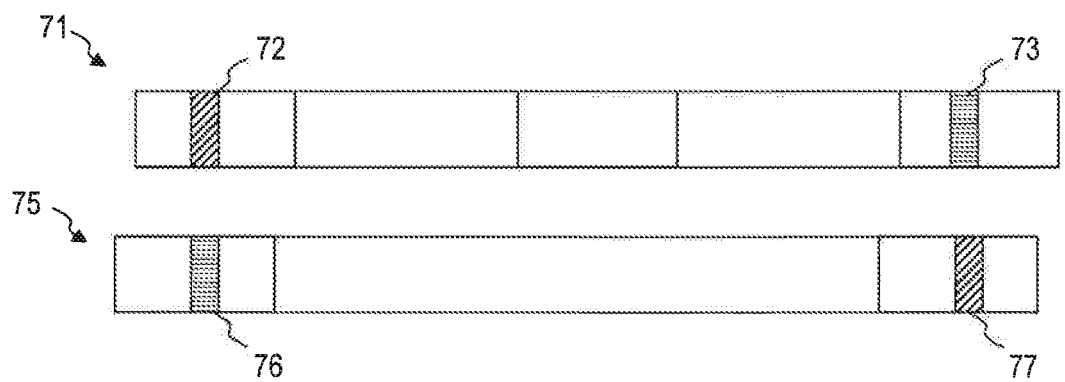
FIG. 7 illustrates network assistance in a position determining procedure according to an embodiment.

FIG. 7 illustrates operation of the base station 11 and the UEs 2, 3, 4 according to an embodiment. A plurality of frames 71 are provided in the cell 9, with device-to-device communication being enabled in at least some of the frames 71. A plurality of frames 75 are provided in the adjacent cell 69.

Resources 72, 73 in at least some of the frames 71 may be allocated to the further UE 3 for the D2D signal or D2D communication message transmission in the position determination procedure. The resources 72, 73 may be periodic uplink resources.

The resources 72, 73 may be allocated by the base station 11 such that they overlap with subframes 76, 77 of the adjacent cell which are muted.

This allows the transmit power of the further UE 3 to be boosted to improve distance determination accuracy, while mitigating interference problems. The boosted transmit power for the further UE 3 in combination with muting of the subframes 76, 77 is effective to improve the positioning accuracy.

Other techniques may be used by the base station 11 to reduce interference with neighboring cells. For illustration, different transmit powers may be assigned to different UEs for the D2D signal transmission in position determination, depending on whether the further UE is located in proximity to an adjacent cell.

The D2D signal or D2D communication message which is transmitted by the further UE(s) and which is detected by the UE in the position determination procedure may have any one of a variety of formats.

For illustration, a D2DSS or D2D communication payload may be used as D2D transmission which is received by the UE and which is processed to determine the relative position.

In order to support even higher accuracy, a dedicated D2D-PRS (D2D-positioning reference signal) may be introduced. The D2D-PRS may allow multiplexing of different further UEs in the time-frequency resource grid. Multiplexing may be effected in the time and/or frequency domain.

Further UEs located at fixed positions, such as in advertisement screens, vending machines, or shop windows, may be used to help the UE more accurately.

The eNodeB and/or UE may determine which kind of signal is to be used in the position determining procedure. This decision may be taken in dependence on a target precision, for example. The eNodeB may provide information on the configuration of the D2D signal which is used in the broadcast message 41. The D2D signal may be selected from a D2D-PRS, a D2DSS, or a D2D payload data transmission. An indicator for the type of D2D signal for the position determination may be included in the broadcast message 41. The configuration of the D2D signal may define a mapping between resources and further UEs 3, 4 which transmit in the position determining procedure.

Figure 8:
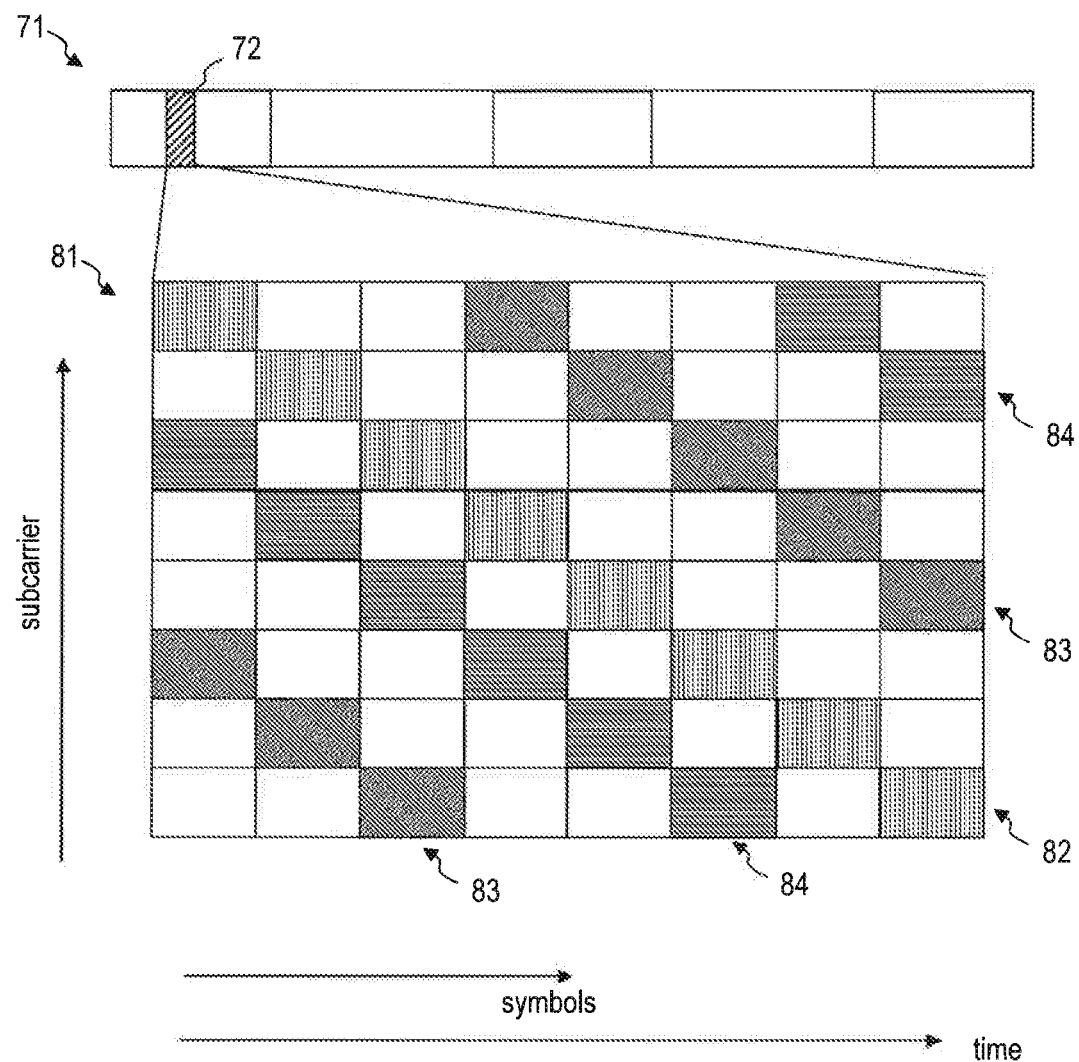
FIG. 8 illustrates resources for signaling in a position determining procedure ac cording to an embodiment.

FIG. 8 illustrates a mapping between symbols and subcarrier frequencies in a resource block and different further UEs. The mapping may be used for allocating resources to different further UEs for transmitting a D2D signal which is detected for relative position determination.

A subframe 72 may be used for D2D communication. Resources in the subframe 72 may be periodic uplink resources which are allocated for D2D signal transmission.

Different subcarriers and symbols in a resource block 81 may be allocated to different further UEs. For illustration, a plurality of subcarriers and symbols 82 may be allocated to a first further UE for D2D signal transmission. The plurality of subcarriers and symbols 82 may be defined such that a different subcarrier is allocated in each of the different symbols of the subframe.

Another plurality of subcarriers and symbols 83 may be allocated to a second further UE for D2D signal transmission. The plurality of subcarriers and symbols 83 may be defined such that a different subcarrier is allocated in each of the different symbols of the subframe.

Yet another plurality of subcarriers and symbols 84 may be allocated to a third further UE for D2D signal transmission. The plurality of subcarriers and symbols 84 may be defined such that a different subcarrier is allocated in each of the different symbols of the subframe.

The allocation may be made in such a way that the plurality of subcarriers and symbols allocated for D2D signal transmission may extend along a diagonal line in the time-frequency resource grid, for example.

More than three transmitting UEs may be supported by the allocation scheme illustrated in FIG. 8.

Figure 9:
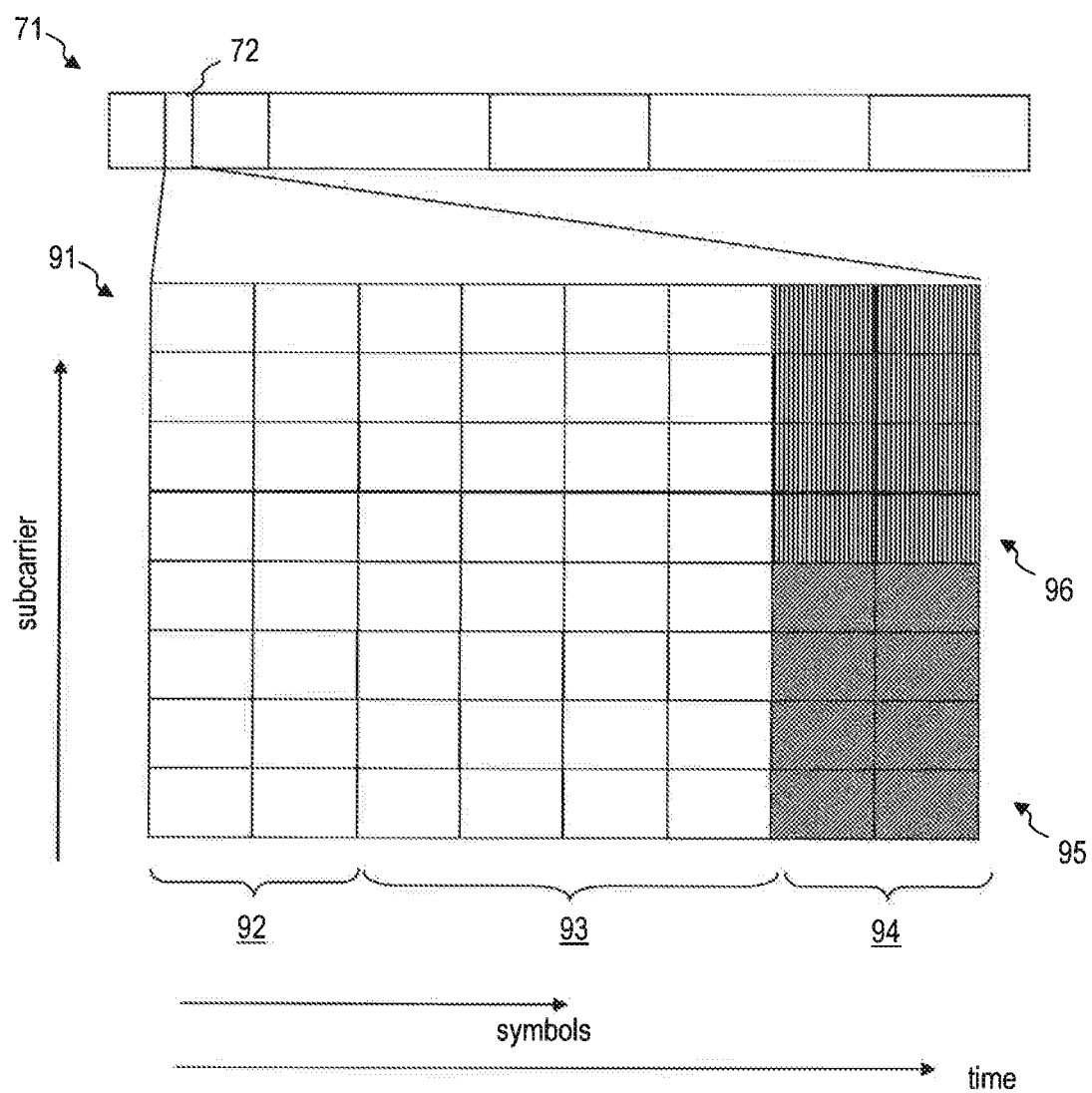
FIG. 9 illustrates resources for signaling in a position determining procedure according to an embodiment.

FIG. 9 illustrates another resource allocation scheme which may be used for allocating resources to different further UEs for transmitting a D2D signal which is detected for relative position determination.

A subframe 72 may be used for D2D communication. Resources in the subframe 72 may be periodic uplink resources which are allocated for D2D signal transmission. The subframe 72 may include symbols 92 for D2DSS transmission, symbols 93 for D2D payload data transmission, and symbols 94 for transmitting D2D signals for relative position determination.

The resources 94 may be allocated to two or more further UEs for transmitting D2D signals. For illustration, time or frequency multiplexing may be performed. In one implementation, frequency multiplexing may be performed such that at least two different subcarriers may be used by two different further UEs for transmitting D2D signals for relative position determination. For illustration, resources 95 may be allocated to a first further UE for transmitting D2D-PRS and other resources 96 may be allocated to a second further UE for transmitting D2D-PRS.

While the resource allocation was exemplarily explained in the context of the transmitting further UEs with reference to FIG. 8 and FIG. 9, the UE which receives and processes the D2D signals for relative position determination may detect the D2D signals in accordance with the allocation schemes explained above.

The devices, systems and methods according to embodiments may be configured to variably adjust the D2D signals which are to be transmitted and/or the type of network assistance provided in the positioning depending on the desired accuracy of the relative position determination. For illustration, if only a very low accuracy is required, the UE may autonomously determine the distance from at least one further UE. If higher accuracy is required, the eNodeB may provide assistance in various ways, as explained with reference to FIG. 1 to FIG. 9 above. Dedicated D2D-PRS transmission may be used to provide the highest accuracy, for example. D2DSS or D2D payload data may be used as reference signal if lower accuracies are sufficient.

Information on a configuration of the resources to be used for transmitting and receiving D2D signals or D2D communication messages for position determination may be broadcast by the base station or may be transmitted by the base station as one-to-one signaling. The configuration information transmitted by the base station, be it as broadcast or as one-to-one signaling, may define a mapping between resources in the time-frequency resource grid and various UEs.

The configuration information may include all or at least one of the information elements defining a PRS configuration over the E-UTRA air interface pursuant to 3GPP TS 36.355.

Figure 10:
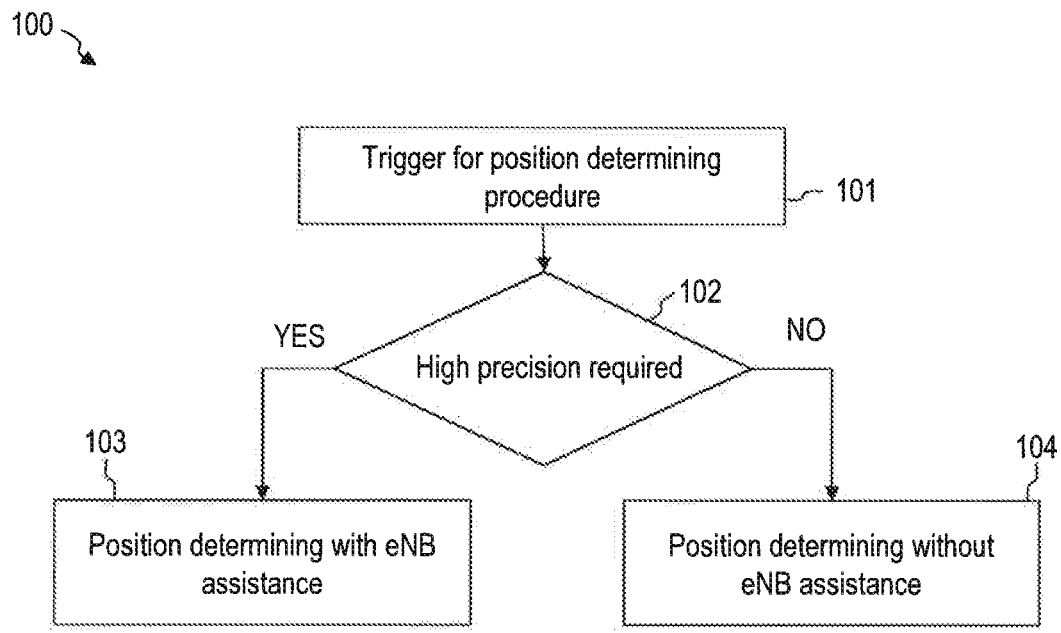
FIG. 10 is a flow chart of a method according to an embodiment.

FIG. 10 is a flow chart of a method 100. The method 100 may be performed by a user equipment or communication system according to an embodiment.

At 101, a position determining procedure is triggered. The trigger may be provided by an application executed locally on the UE 2. The trigger may be a network event. The trigger may also be a request for emergency service indicated by a further UE 3, 4 in the same cell.

At 102, it is determined whether the relative position must be determined with high precision or with low precision. The decision may be made autonomously by the UE 2, e.g. depending on an accuracy required by an application which triggers the position determination. The decision may be made under the control of the eNodeB 11, e.g. in order to support different network-initiated processes.

At 103, if a high precision of the relative position determination is required, the position determination is performed with eNodeB assistance. The eNodeB may provide information on the resources, transmit powers and/or transmitting further UEs in a broadcast message, for example. The eNodeB may optionally also perform part or all of the processing of raw data measured by the UE to determine the relative position. Dedicated D2D-PRS may be used to provide particularly good spatial accuracy.

At 104, if a lower accuracy is sufficient, the relative position may be determined without eNodeB assistance. Alternatively, the eNodeB may still be involved in the position determination procedure, but D2DSS or D2D payload data may be used as reference signals for the position determination.

Figure 11:
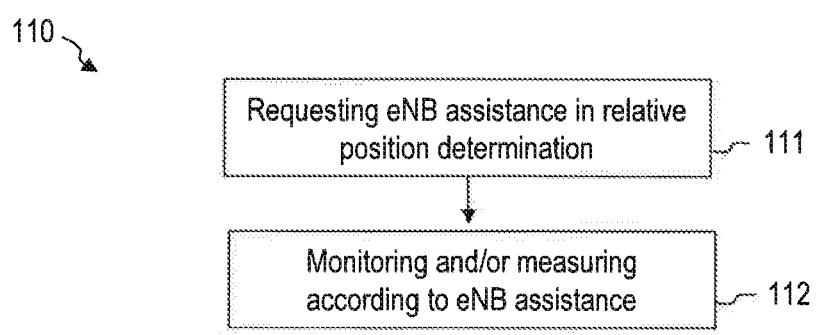
FIG. 11 is a flow chart of a method according to an embodiment.

FIG. 11 is a flow chart of a method 110. The method 110 may be performed by a user equipment or communication system according to an embodiment. In the method 110, the UE may request the eNodeB to provide assistance in position determination. The method may be performed to implement step 103 in the method 100 of FIG. 10.

At 111, the UE may request eNodeB assistance in determining the relative position of the UE and at least one further UE. The UE may transmit a RRC message or may perform other signaling to request eNodeB assistance in determining the relative position.

At 112, the UE may detect D2D signals or D2D communication messages which are transmitted in accordance with resources and/or transmit powers and/or further UE identifiers provided by the eNodeB. The UE may measure time of arrival differences and/or received signal power. The UE may process the measurement results to compute the relative position and/or may report the measurement results to the eNodeB.

Figure 12:
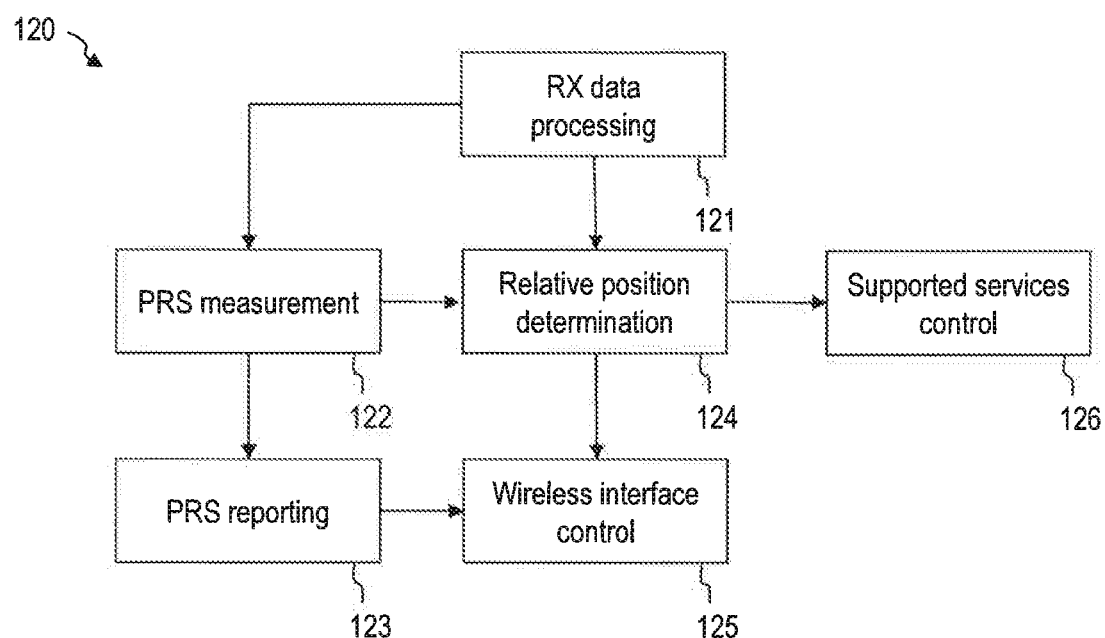
FIG. 12 is a functional block diagram of a user equipment according to an embodiment.

FIG. 12 is a block diagram 120 of a UE according to an embodiment. The modules may be implemented in hardware, software, firmware, or a combination thereof.

The UE may comprise a processing module 121 for processing received signals. The processing module 121 may be operative to process both signals from a cellular communication network and signals from further UEs received in D2D discovery and/or D2D communication.

The UE may comprise a measurement module 122 which measures characteristics of at least one positioning reference signal (PRS) received via D2D communication. The measurement module 122 may determine a received signal strength. The measurement module 122 may determine a time of arrival of one or several PRSs.

The UE may comprise a reporting module 123. The reporting module 123 may be coupled to a wireless interface control 125 to cause transmission of reports to the base station. The reports may comprise information on measurements results obtained by the measurement module 122.

The UE may comprise a relative position determining module 124 for determining at least a distance between the UE and at least one further UE. The relative position determining module 124 may be operative to process measurement results obtained by the measurement module 122. The relative position determining module 124 may be configured to estimate a distance based on signal attenuation. The relative position determining module 124 may be configured to perform a multilateration to establish the distance of the UE from several further UEs from which PRSs are received.

The UE may comprise a supported services control module 126 which manages the supported services which make use of the determined relative position. The supported services control module 126 may include additional services into a set of supported services which may be executed if higher precision position information is available.

In any one the devices, systems and methods disclosed herein, the D2D reference signal may be a D2D signaling message, such as a D2DSS or a D2D-PRS, or a D2D communication message, such as payload data included in D2D communication.

Modifications or alterations may be implemented in other embodiments. For illustration, resources may be pre-configured in UEs not only by a base station, but also by another UE which acts as a group head for a D2D communication group, or by a repeater relay.

In any one of the various embodiments, D2DPRS signals may be received by the UE from at least one further UE. The D2DPRS signals may be configured as defined for PRS signals in 3GPP TS 36.355 entitled "LTE; Evolved Universal Terrestrial Radio Access (E-UTRA); LTE Positioning Protocol (LPP)", it being understood that the PRS will be transmitted as direct signaling between UEs. The message broadcast or otherwise transmitted by the eNodeB may include the configuration information on the D2DPRS signals as defined in 3GPP TS 36.355 entitled "LTE; Evolved Universal Terrestrial Radio Access (E-UTRA); LTE Positioning Protocol (LPP)". The PRS may be configured as defined in 3GPP TS 36.355 V 12.2.0.

For further illustration, while a broadcast message may be used to inform the UE which receives D2D reference signals and the further UEs which transmit the D2D reference signals of allocated resources and/or transmit powers and/or other parameters, dedicated signaling may be used instead of the broadcast message.

Embodiments of the invention allow relative positions between user equipments to be determined with high accuracy if such high accuracy is required. Device-to-device communication and network assistance are combined to provide efficient position determination while mitigating interference and battery lifetime issues.

The invention claimed is:

1. A user equipment, comprising:
a wireless interface for communication with a cellular communication network, wherein the wireless interface being operative for:
a device-to-device transmission and/or a device-to-device reception in a position determining procedure in which a relative position between the user equipment and at least one further user equipment is determined, and
communication with a radio access network node of the cellular communication network for network assistance in the position determining procedure, wherein the device-to-device transmission and/or the device-to-device reception in the position determining procedure does not involve communication with or through the radio access network node; and
a processing device being operative for controlling the user equipment during the position determining, wherein the processing device is configured to:
request the radio access network node to transmit a message associated with the position determining procedure in dependence on a target precision for the relative position determined during the position determining procedure;
receive the message associated with the position determining procedure from the radio access network node; and
control at least one of:
a transmission of a device-to-device message to the at least one further user equipment to enable the at least one further user equipment to determine the relative position with the user equipment based on a measurement of the device-to-device message transmitted; or
a reception of a device-to-device message from the at least one further user equipment and a determination of the relative position to the at least one further user equipment based on a measurement of the device-to-device message received,
wherein the least one of the transmission or reception of the device-to-device message is in accordance with the message received from the radio access node.

2. The user equipment according to claim 1,
wherein the message is a broadcast message from the radio access network node or a signaling message from the radio access network node.

3. The user equipment according to claim 1,
wherein the message comprises at least one of
information on resources to be used for the device-to-device transmission and/or the device-to-device reception in the position determining procedure, and/or
information on a transmit power to be used for the device-to-device transmission in the position determining procedure.

4. The user equipment according to claim 1,
wherein the device-to-device message received from the at least one further user equipment is a device-to-device signaling message or a device-to-device communication message, and
wherein the processing device being further operative to process the received device-to-device signaling message or device-to-device communication message based on the message received from the radio access network node.

5. The user equipment according to claim 4,
wherein the processing device is operative to determine the relative position by measuring the received device-to-device signaling message or device-to-device communication message based on the message received from the radio access network node.

6. The user equipment according to claim 1,
wherein the message received from the radio access network node comprises information on a resource and a configuration of a device-to-device positioning reference signal,
wherein the device-to-device message transmitted or received by the user equipment is the device-to-device positioning reference signal.

7. The user equipment according to claim 1,
wherein the user equipment is operative to transmit a report message to the radio access network node, the report message being indicative of a measurement result obtained from the measurement of the device-to-device message received from the at least one further user equipment.

8. The user equipment according to claim 7,
wherein the user equipment is operative to receive information on the relative position from the radio access network node in response to transmitting the report message.

9. A radio access network node, comprising:
a wireless interface for communication with a user equipment, and
a control device coupled to the wireless interface, the control device being operative to assist the user equipment in a position determining procedure with a device-to-device transmission and/or device-to-device reception, wherein a relative position between the user equipment and at least one further user equipment is determined in the position determining procedure based on measurements of device-to-device messages, wherein the device-to-device transmission and/or the device-to-device reception in the position determining procedure does not involve communication with or through the radio access network node,
wherein the radio access network is operative to:
receive a request from the user equipment to transmit a message associated with the position determining procedure;
generate the message in dependence on a target precision of the position determining procedure; and
transmit the message to the user equipment, the message including information utilized by the user equipment in the position determining procedure such that the position determining procedure includes both (i) device-to-device transmission and/or device-to-device reception between the user equipment and the at least one further user equipment, and (ii) communication between the user equipment and the radio access network node of the cellular communication network.

10. The radio access network node according to claim 9, wherein the message comprises at least one of
information on resources to be used by the user equipment in the position determining procedure, and/or
information on a transmit power to be used in the position determining procedure.

11. The radio access network node according to claim 10, wherein the message comprises information on a resource and a configuration of a device-to-device positioning reference signal.

12. The radio access network node according to claim 9, wherein the wireless interface is operative to receive a report message from the user equipment,
wherein the control device is operative to determine the relative position of the user equipment and the at least one further user equipment in response to receiving the report message.

13. The radio access network node according to claim 12, wherein the radio access network node is operative to transmit information on the relative position to the user equipment in response to the report message.

14. A communication system, comprising:
a user equipment comprising:
a first wireless interface for communication with a cellular communication network, the first wireless interface being operative for:
  a device-to-device transmission and/or a device-to-device reception in a position determining procedure in which a relative position between the user equipment and at least one further user equipment is determined based on a measurement of a device-to-device message, and
  communication with a radio access network node of the cellular communication network for network assistance in the position determining procedure, wherein the device-to-device transmission and/or the device-to-device reception in the position determining procedure does not involve communication with or through the radio access network node; and
a processing device being operative for controlling the user equipment, wherein the processing device is configured to:
  request the radio access network to transmit a message associated with the position determining procedure, and
  receive the message associated with the position determining procedure from the radio access network node; and
the radio access network node comprising:
a second wireless interface for communication with the user equipment, and
a control device coupled to the second wireless interface, the control device being operative to:
  receive the request from the user equipment to transmit the message associated with the position determining procedure,
  generate the message in dependence on a target precision of the position determining procedure, and
  transmit the message to the user equipment, the message including information utilized for the position determining procedure to assist the user equipment in the position determining procedure for determining the relative position of the user equipment and the at least one further user equipment.

15. A method of determining a relative position between a user equipment and at least one further user equipment, the method comprising
performing, via a wireless interface of the user equipment, a device-to-device transmission and/or a device-to-device reception in a position determining procedure for determining the relative position between the user equipment and the at least one further user equipment, wherein the device-to-device transmission and/or the device-to-device reception in the position determining procedure does not involve communication with or through a radio access network node;
communicating, via the wireless interface of the user equipment, with the radio access network node of a cellular communication network for obtaining information providing network assistance in the position determining procedure;
measuring a device-to-device message received from the at least one further user equipment; and
determining the relative position based on a measurement result from the device-to-device message,
wherein at least one of the measuring of the device-to-device message or the determining of the relative position is based at least in part on the information obtained from the radio access network node, and
wherein the information includes a message associated with the position determining procedure generated by the radio access network node in dependence on a target precision of the position determining procedure.

* * * * *